US007447563B2

(12) United States Patent
Dobos

(10) Patent No.: US 7,447,563 B2
(45) Date of Patent: Nov. 4, 2008

(54) AUTOMATIC FLOWER-SELLING EQUIPMENT

(76) Inventor: István Dobos, Dr. Varga L. u. 35., Szigetszentmiklós, H-2310 (HU)

(*) Notice: Subject to any disclaimer, the term of this patent is extended or adjusted under 35 U.S.C. 154(b) by 181 days.

(21) Appl. No.: 10/553,141

(22) PCT Filed: Apr. 5, 2004

(86) PCT No.: PCT/HU2004/000028

§ 371 (c)(1),
(2), (4) Date: Oct. 14, 2005

(87) PCT Pub. No.: WO2004/093020

PCT Pub. Date: Oct. 28, 2004

(65) Prior Publication Data

US 2006/0219729 A1 Oct. 5, 2006

(30) Foreign Application Priority Data

Apr. 16, 2003 (HU) ................................ 0300097 U

(51) Int. Cl.
*G06F 17/00* (2006.01)

(52) U.S. Cl. ....................... 700/231; 700/232; 700/233; 700/243; 221/9; 221/10; 221/12; 221/13

(58) Field of Classification Search ......... 700/231-244; 221/1-312 C
See application file for complete search history.

(56) References Cited

U.S. PATENT DOCUMENTS

| | | | | |
|---|---|---|---|---|
| 986,875 | A * | 3/1911 | Tilghman | 62/250 |
| 3,336,773 | A * | 8/1967 | Oechslin | 70/337 |
| 4,311,227 | A * | 1/1982 | Watkins | 194/206 |
| 5,146,709 | A * | 9/1992 | Iseki | 47/41.01 |
| 5,971,273 | A * | 10/1999 | Vallaire | 235/381 |
| 6,123,223 | A * | 9/2000 | Watkins | 221/121 |
| 6,474,501 | B1 * | 11/2002 | Volpatti | 221/75 |
| 7,086,198 | B2 * | 8/2006 | Hayden | 47/41.01 |

FOREIGN PATENT DOCUMENTS

| | | | |
|---|---|---|---|
| AU | 2003901349 | A * | 3/2003 |
| EP | 0 710 936 | A1 | 5/1996 |
| WO | WO 99/22347 | | 5/1999 |

* cited by examiner

*Primary Examiner*—Gene O. Crawford
*Assistant Examiner*—Michael K Collins
(74) *Attorney, Agent, or Firm*—Joseph G. Seeber

(57) ABSTRACT

Automatic flower-selling equipment comprises a housing including a casing having a selecting partial unit situated thereon and defining a storage space suitable for storing and protecting flowers, a bearing unit situated in the storage space for displaying flowers, a moving unit connected to the bearing unit, and a control unit connected to the moving unit. The control unit is connected to the selecting partial unit, and the bearing unit has a supporting column rotatably attached to the housing and supporting structures attached at different vertical positions to the supporting column. The supporting structures have a supporting tray suitable for supporting flowers and several separating sheets dividing the supporting trays into parts, and at least one delivery door each delivery door being connected to a delivery outlet for removing chosen flowers. At least some supporting structures have a distribution ring cooperating with the supporting tray, and separating sheets are arranged radially on the distribution ring independently of the supporting tray.

15 Claims, 1 Drawing Sheet

AUTOMATIC FLOWER-SELLING EQUIPMENT

TECHNICAL FIELD

The subject of the invention is automatic flower selling equipment, which contains a housing including storage space suitable for storing and protecting flowers, a bearing unit situated in the storage space of the housing for displaying the flowers, a moving unit connected to the bearing unit and a control unit connected to the moving unit. The control unit is connected to a selecting partial unit situated on the casing of the housing, and the bearing unit has a supporting column attached to the housing in a rotatable way and supporting structures attached to the supporting column below each other. The supporting structures have a supporting tray suitable for supporting the flowers, and several separating sheets dividing the supporting trays into parts, and all of the parts of the supporting tray in between two adjacent separating sheets are identified with individual distinctive marks. One or more delivery doors are arranged on the casing of the housing, and the delivery door is connected to a delivery outlet for taking out the chosen flowers.

RELATED ART

Automatic vending machines have become widely used by now in numerous fields of life. Basically the recommended products or services are placed in closed storage units in public areas, where average consumers can buy or use them without the help of a salesperson in the case where they pay the right amount of money. Such vending machines are also known in the field of flower sale.

One of these, described in the published International Application No. WO 99/22347, relates to a solution suitable for the individual sale of flowers. Here, the flowers are situated in several horizontal lines and on a spiral in each line. The spiral delivery devices advance the flowers and send the flower nearest to the delivery outlet into the delivery window accessible to the buyer.

However, the basic disadvantage of this arrangement is that, because of the construction and operation of the advancing and feeding mechanism, it is not possible to select the flower that the buyer intends to buy, and it is also not possible to view the selection of flowers situated in the storage space of the equipment.

A further deficiency is that storing of the flowers to be sold in a horizontal position has an undesirable effect on the shelf life of the plants in that they deteriorate quickly and become impossible to sell.

Another disadvantage is that the individual flowers may get damaged while they are being advanced, which reduces the chances of selling them even more.

A further disadvantage of the equipment is that, due to the undesirable storage position and advancing method, the flowers do not have a continuous water supply, which has a negative effect on the conditioning and shelf life of the flowers.

Equipment suitable for selling pot plants, bouquets and other green plants is described in European Patent Application No. EP 710.936. This structure contains a rotatable bearing unit inside the closed storage space, which makes it possible for the buyers to view all of the flowers and plants offered for sale and to choose from them as they like. A continuous water supply for the plants and flowers is provided by a water-recirculating unit.

However, the disadvantage of this arrangement is that it is not suitable for selling single flowers independently, and because of its construction, despite the fact that it occupies a large space, it is suitable for the storage and sale of only a small amount of flowers.

DISCLOSURE OF INVENTION

An object of the present invention is to overcome the deficiencies of the known flower selling equipment and to create a version which, despite its small space demand, is suitable for storing a large amount of different plants and flowers in an energy sparing mode and at minimum cost while also ensuring long-lasting freshness and delivery of such plants and flowers in a simple and quick manner, and excluding the possibility of unauthorised access.

The arrangement according to the present invention is based on the recognition that, if flowers are placed in a bearing unit constructed differently from the previous known solutions, including special separating pieces, and the delivery window is constructed to suit the supporting structure, then the flowers can be stored in a desirable, nearly vertical position so that, in the course of their delivery, only one single flower is accessible in each case, thereby solving a problem with previous arrangements.

In accordance with the set objective, the automatic flower-selling equipment according to the invention comprises a housing including storage space suitable for storing and protecting flowers, a bearing unit situated in the storage space of the housing for displaying the flowers, a moving unit connected to the bearing unit, and a control unit connected to the moving unit. The control unit is connected to a selecting partial unit situated on the casing of the housing. The bearing unit has a supporting column attached to the housing in a rotatable way and supporting structures attached to the supporting column below each other. The supporting structures have a supporting tray suitable for supporting the flowers, and several separating sheets dividing the supporting trays into parts, and all of the parts of the supporting tray in between two adjacent separating sheets are identified with individual distinctive marks. One or more delivery doors are arranged on the casing of the housing, and each delivery door is connected to a delivery outlet for taking out the chosen flowers. The equipment is constructed in such a way that at least some of the supporting structures have a distribution ring co-operating with the supporting tray, situated above the supporting tray, and having a projection perimeter at least partly bordering on the outside perimeter of the projection of the supporting tray falling on the reference plane at right angles to the longitudinal axis of the supporting column. The separating sheets are arranged at regular intervals, preferably radially, on the distribution ring independently of the supporting tray, and the curve between two separating sheets of the distribution ring is identified with distinctive marks. The delivery outlet situated in the environment of the distribution ring is equipped with a cross-section restricting mask suitable to the size of the interval between the two separating sheets, and in this way the delivery outlet is restricted to the delivery window suitable to the interval.

A further preference for the equipment of the invention is that at least some of the supporting trays are equipped with a water-storage trough.

In an embodiment of the invention, a water recirculating partial unit is placed in the housing, and the water recirculating partial unit has a water-storage tank, a pump and water-conducting passages. At least some of the water-conducting passages are situated inside the supporting column.

In this aspect of the equipment, it may be preferable that the selecting partial unit be combined with a money-handling partial unit and/or the storage space of the housing be connected to air-conditioning equipment.

In a further construction of the invention, the distribution ring is combined with a skirt situated below it.

In another different realisation of the equipment, at least a part of the casing of the housing is constructed of large arched door elements made of a transparent material, e.g., plexiglass, and the door elements are situated near and along the supporting structures.

In a further different construction of the invention, the selecting partial unit has a display unit and a data input unit.

In another different version of the equipment, the individual curves of the distribution ring and the position of the supporting column in relation to the delivery door are allocated to each other, with the help of a distinctive mark, via the control unit. An opening structure is inserted between the housing and the delivery door.

The most important advantage of the automatic flower-selling equipment according to the invention is that, due to the novel construction of the bearing unit, it is suitable for selling potted plants, bouquets and single flowers at the same time. The construction, which is different from the known solutions, also makes it possible to change over from selling a certain type of plants or flowers to selling another type in a short period of time, so that the same equipment can be used to sell only potted plants or only bouquets or only single flowers or an optional combination of them.

It is also an advantage of the equipment, especially in the case of single flowers, that despite the fact that it occupies a small space, it is suitable for storing a large amount of flowers for a long time. With the help of the distribution rings which can be integrated in the bearing unit, it is also made possible for the buyers to view all of the flowers for sale before making a decision, so that they can buy the flowers that they find the most suitable. This is possible due to the special arrangement of the single flowers in the storage space.

Another advantage relates to the arrangement of single flowers, which is different from the known solutions, namely, that the chosen flowers are delivered much more carefully than in the case of traditional flower-selling equipment, so that the danger of damaging the chosen single flowers is practically eliminated.

It is also advantageous that, due to the construction of the distribution ring holding single flowers and the use of the specially formed cross-section restricting mask, unauthorised access to the flowers can be excluded, which means that it is not possible to get the flowers situated in the storage space without paying the right price for them.

Another advantage is that the casing of the housing, its large door, and the geometrical shape of the casing make it easier to put in the flowers for sale and to clean the internal space of the equipment, and it also has a favourable effect on the buyers' possibility of choice, and its attractive appearance encourages people to buy flowers. Through the large doors made of a transparent material, the bearing unit filled with single flowers looks like one big bush of flowers, where the buds of the individual flowers have different identifiers. So far, no other equipment has shown such an arrangement or appearance.

BRIEF DESCRIPTION OF DRAWINGS

The automatic flower-selling equipment according to the invention is described below in connection with a construction example, on the basis of the drawings, in which.

DETAILED DESCRIPTION

Figure 1:
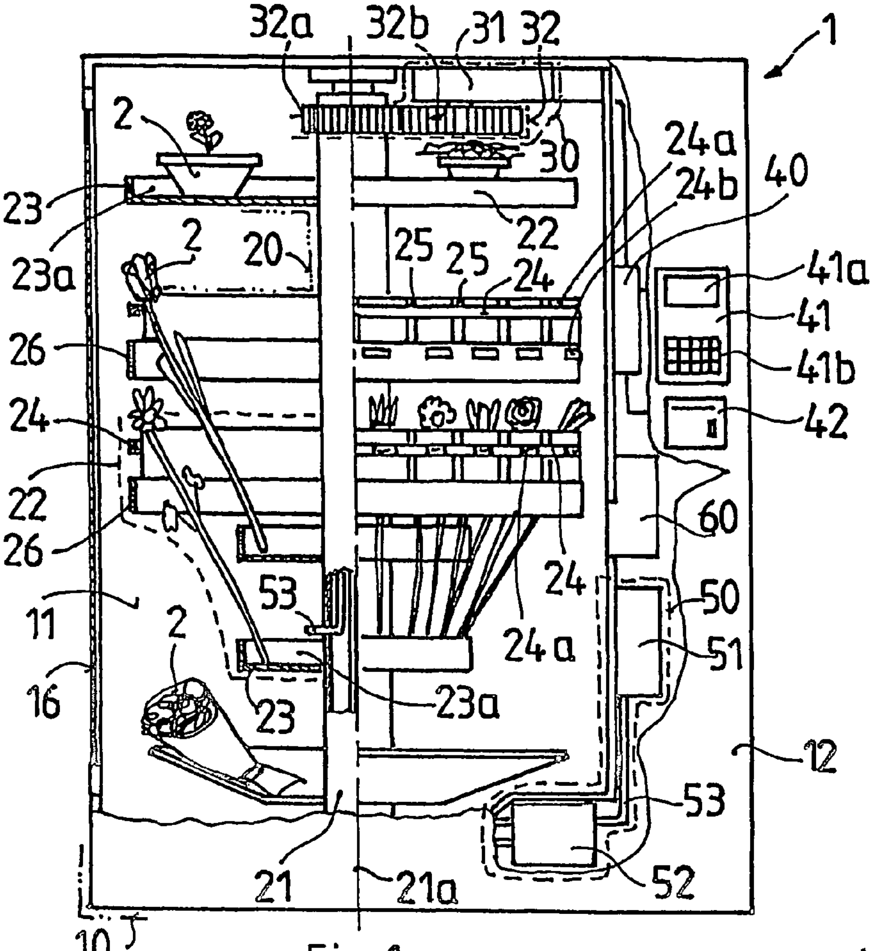
FIG. 1 shows the side view of the selling equipment partially in section.

FIG. 1 shows a version of the flower selling equipment 1 according to the invention, with the help of which potted plants, bouquets and single flowers 2 can also be sold. It can be seen that the housing 10 of the flower-selling equipment 1 is surrounded by a casing 12. Inside this casing 12, there is a storage space 11 containing a bearing unit 20, a moving unit 30, a control unit 40, a water recirculating partial unit 50 and air-conditioning equipment 60.

Figure 2:
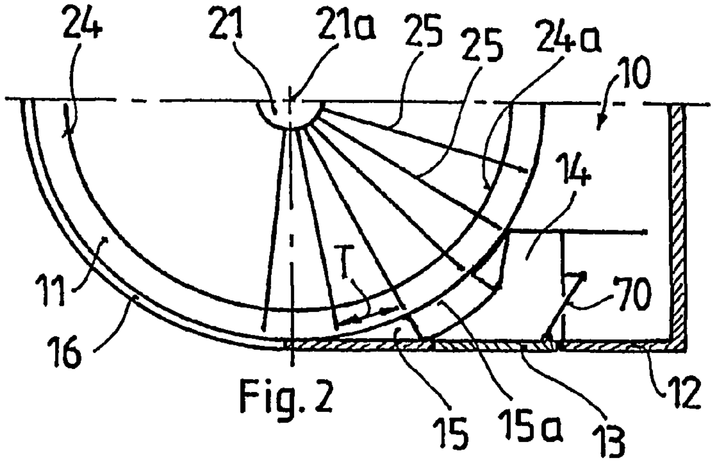
FIG. 2 shows a part of FIG. 1 taken from direction II.

The door elements 16 with a large transparent surface are parts of the casing 12, and practically—as can be seen in FIG. 2—they are made of plexiglass bent to the desired shape, and spaced at small intervals so that they follow the basically cylindrical covering surface of the bearing unit 20. The delivery door 13 also belongs to the casing 12, and behind it there is a delivery outlet 14. The delivery outlet 14 connects the storage space 11 of the housing 10 with the delivery door 13. The dimensions of the delivery outlet 14 are chosen so that the largest plants or flowers 2 that can be placed in the flower-selling equipment 1 can be taken out through it without any damage. In accordance with this, in practice, cross-section-restricting masks 15, restricted with a delivery window 15*a*, should be placed in the delivery outlets 14 serving to deliver single flowers 2. These cross-section-restricting masks 15—together with the construction of the bearing unit 2 of the right shape—prevent unauthorised access to the content of the storage space 11 of the flower-selling equipment 1 through the delivery outlet 14.

FIG. 2 also shows that, between the delivery door 13 and the relevant part of the casing 12 of the flower-selling equipment 1, an opening structure 70 is built in the delivery outlet 14, with the help of which the delivery door 13 opens automatically at a certain stage of the purchase.

Returning to FIG. 1, it also shows that the bearing unit 20 includes a supporting column 21 and supporting structures 22 attached to the supporting column 21, built from different elements. Every supporting structure 22 has a supporting tray 23 for supporting the flowers 2. At the same time, there are water-storage troughs in at least those supporting trays 23 that carry single flowers 2.

Beside a supporting tray 23, each of the supporting structures 22 suitable for displaying single flowers 2 also contains a distribution ring 24 positioned symmetrically relative to the longitudinal axis 21*a* of the supporting column 21, which distribution ring 24 is equipped with radially positioned separating sheets 25. It can be seen in FIG. 2 that, with the separating sheets 25 fixed in an arranged way, the distribution ring 24 is divided into equally sized curves 24*a*. The "T" interval belonging to a curve 24*a* between two separating sheets 25 is exactly the same size as the same direction of the delivery window 15*a* of the cross-section restricting mask 15 fixed in the delivery outlet 14.

At the same time, FIG. 1 also shows that the distribution ring 24 is practically equipped with a skirt 26 situated below it, attached to the separating sheets 25. The skirt 26 is a cylindrical shell shaped plate insert, which is also positioned symmetrically relative to the longitudinal axis 21*a* of the supporting column 21. A distinctive mark 24*b*, e.g., an Arabic figure, belongs to each one of the curves 24*a* between the separating sheets 25, or to each part of the skirt situated below them belonging to the given curve 24*a*, which distinctive mark 24*b* clearly identifies the area characterised by a sector bordered by the curve 24*a*, a part of the skirt 26 and the separating sheets 25, which is the physical storage place of one single flower 2.

In the case of supporting structures 22 that have neither a distribution ring 24 nor a skirt 26, the distinctive marks 24*b* are obviously attached to the appropriate parts of the supporting trays 23 forming the supporting structure 22.

Figure 3:
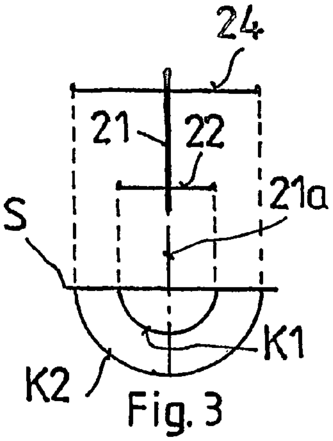
FIG. 3 shows the basic diagram of a part of the bearing unit.

It can also be seen in FIG. 1 that the dimensions of the distribution ring 24 exceed the dimensions of the supporting tray 23 so that, with the help of FIG. 3, it can be understood that the "K2" projection perimeter of the distribution ring 24 falling on the "S" reference plane at right angles to the longitudinal axis 21*a* of the supporting column 21 encircles the "K1" perimeter of the supporting tray 23 falling on the "S" reference plane. According to FIG. 3, the "K1" perimeter and the "K2" projection perimeter are concentric circular rings. Consequently, as shown in FIG. 1, the single flowers 2 are situated in a slightly canting position in the supporting structure 22 formed by the distribution ring 24 and the supporting tray 23 together. If the distances between the distribution rings 24 placed at different heights along the supporting column 21, and obviously the distances of the supporting trays 23 belonging to the individual distribution rings 24, are chosen favourably, then on the part of the bearing unit 20, where single flowers 2 are displayed, the viewer can practically see a skirt consisting of flower-buds, whereas under the individual displayed flower-buds, there are distinctive marks 24*b* for the identification of the flower-buds.

For the attractive arrangement of single flowers 2, the stem of the flower 2 placed in the upper distribution ring 24 must go through the space bordered by the curve 24*a* and the separating sheets 25 of one or more distribution rings 24 below the flower 2, and threaded through them, it must end in the supporting tray 23 belonging to the given supporting structure 22.

The moving unit 30 is responsible for rotating the supporting column 21 around the longitudinal axis 21*a*. The moving unit 30 includes the motor 31 and the traversing partial unit 32, which in this case consists of a cogwheel 32*a* fitted onto the supporting column 21 and another cogwheel 32*b* attached to the motor 31.

The water-storage troughs 23*a* of the supporting trays 23 of the bearing unit 20 are supplied with water for the flowers 2 by the water-recirculating partial unit 50. The water-recirculating partial unit 50 contains a water-storage tank 51, a pump 52 and the water-conducting passages 53. In the case of this construction, the water-conducting passages 53 go inside the supporting column 21, and in this way they connect the water-storage tank 51 with the water-storage troughs 23*a* of the supporting trays 23, interposing the pump 52.

The operation of the flower-selling equipment 1 is controlled and directed by the control unit 40 situated in the storage space 11. The control unit 40 is combined with a display unit 41*a* fitted on the casing 12 of the housing 10, a selecting partial unit 41 equipped with a data input unit 41*b*, and a money-handling partial unit 42. The selecting partial unit 41 sends information about the buyers' choice to the control unit 40, while the money-handling partial unit 42 sends information about the payment of the price to the control unit 40.

In the course of the operation of the flower-selling equipment 1 according to the invention, first the door elements 16 of the casing 12 of the housing 10 must be opened, and the supporting structures 22 of the bearing unit 20 must be filled with flowers 2. Potted plants 2 are placed on a simple supporting tray 23 separated by separating elements, while bouquets 2 are placed on a supporting tray 23 of a slightly different shape. The placement of single flowers 2 into the bearing unit 20 needs more attention. The stem of each single flower 2 must be threaded through curve 24*a* between the two separating sheets 25 of a distribution ring 24 in such a way that the stem of the flower 2 should go through the space bordered by further distribution rings situated below the given distribution ring 24, and then it should end up leaning against the supporting tray 23 belonging to the distribution ring 24. When there is a single flower 2 in each curve 24*a*, the door element 16 can be closed and the flower-selling equipment 1 is ready to serve customers.

After turning on the flower-selling equipment 1, the motor 31 of the moving unit 30 starts turning the other cogwheel 32*b* of the traversing partial unit 32, which starts up the one cogwheel 32*a*. The rotation of the one cogwheel 32*a* starts to rotate the supporting column 21 of the bearing unit 20. The supporting structures 22 move with the supporting column 21 rotating around its longitudinal axis, and in this way the customers standing in front of the flower-selling equipment 1 can look through the transparent surface of the door elements 16 and view all of the flowers 2 for sale passing in front of them without having to change their position.

After turning on the equipment 1, the air-conditioning equipment 60 also starts to work, creating conditions that are the most suitable for keeping the flowers 2 fresh for a long time in the storage space 11 of the housing 10 of the flower-selling equipment 1, in accordance with the normal operation of such equipment. Obviously, by turning on the flower-selling equipment 1, the water-recirculating partial unit 50 also starts to work. As a result of this, the pump 52 pumps water from the water-storage tank 51 through the water-conducting passages 53 into the water-storage troughs 23*a* situated in the supporting trays 23 of the supporting structures 22 of the bearing unit 20, and from there the flowers 2 can use the water as they need it. The moving unit 30, the air-conditioning equipment 60 and the water-recirculating partial unit 50 continue to operate as long as the flower-selling equipment 1 is turned on.

When a customer has chosen the flower that he/she finds the best, he/she enters the distinction mark 24*b* belonging to the given flower 2 via the data input unit 41*b* of the control unit 40, and he/she can check whether the entered distinction mark 24*b* is right on the display unit 41*a* of the selecting partial unit 41. After entering the distinction mark 24*b*, the customer puts the prescribed price in the money-handling partial unit 42.

After checking the paid amount and the received distinction mark 24*b*, the control unit 40 instructs the moving unit 30 to rotate the curve 24 with the entered distinction mark 24*b*, or a given part of the supporting tray 23 of some other supporting structure 22, to the delivery outlet 14 situated behind the delivery door 12 of the casing. After the positioning, instructed by the control unit 40, the opening structure 70 opens the delivery door 13 belonging to the given delivery outlet, and the customer can put his/her hand in there. The chosen flower 2—depending on its size—can be taken out of the storage space 11 of the housing 10 of the flower-selling equipment 1 through the delivery outlet 14, or if it is a single flower 2, it can be taken out through the delivery window 15 of the cross-section restricting mask 15 fitted in the delivery outlet 14.

The flower-selling equipment according to the invention can be used at any public places where passers-by can satisfy their flower-purchasing demands.

While preferred forms and arrangements of the invention have been disclosed herein, it should be recognized that various modifications can be made without departing from the scope of the invention, as defined in the appended claims.

The invention claimed is:

1. Automatic flower-selling equipment, comprising:

a housing including a casing having a selecting partial unit situated thereon, and defining a storage space suitable for storing and protecting flowers;

a bearing unit situated in the storage space of the housing for displaying the flowers;

a moving unit connected to the bearing unit; and a control unit connected to the moving unit;

wherein the control unit is connected to the selecting partial unit situated on the casing of the housing;

wherein the bearing unit has a supporting column rotatably attached to the housing and supporting structures attached at different respective vertical positions to the supporting column;

wherein the supporting structures have a supporting tray suitable for supporting the flowers and several separating sheets dividing the supporting trays into parts, all of the parts of the supporting tray in between two adjacent separating sheets being identified with individual distinctive marks, and at least one delivery door being arranged on the casing of the housing, said at least one delivery door being connected to a delivery outlet for removing chosen flowers;

wherein at least some of the supporting structures have a distribution ring cooperating with the supporting tray, and situated above the supporting tray, said distribution ring having a circumference located outside a circumference of the supporting tray and having a projection perimeter at least partly bordering an outside perimeter of a projection of the supporting tray located on a reference plane at right angles to a longitudinal axis of the supporting column;

wherein the separating sheets are arranged at regular intervals radially on the distribution ring independently of the supporting tray, and a curve between two separating sheets of the distribution ring is identified with the distinctive marks, and the delivery outlet situated adjacent to the distribution ring is equipped with a cross-section restricting mask corresponding to a size of the interval between the two separating sheets;

whereby the delivery outlet is restricted to a delivery window in accordance with the interval.

2. The automatic flower-selling equipment of claim 1, wherein at least some of the supporting trays are equipped with a water-storage trough.

3. The automatic flower-selling equipment of claim 2, further comprising a water recirculating partial unit disposed in the housing, the water recirculating partial unit including a water-storage tank, a pump and water-conducting passages.

4. The automatic flower-selling equipment of claim 3, wherein at least some of the water-conducting passages are situated inside the supporting column.

5. The automatic flower-selling equipment of claim 1, further comprising a water recirculating partial unit disposed in the housing, the water recirculating partial unit including a water-storage tank, a pump and water-conducting passages.

6. The automatic flower-selling equipment of claim 5, wherein at least some of the water-conducting passages are situated inside the supporting column.

7. The automatic flower-selling equipment of claim 1, further comprising a money-handling partial unit combined with the selecting partial unit.

8. The automatic flower-selling equipment of claim 1, further comprising air-conditioning equipment connected to the storage space of the housing.

9. The automatic flower-selling equipment of claim 1, further comprising a skirt combined with and disposed below, the distribution ring.

10. The automatic flower-selling equipment of claim 1, wherein the casing of the housing includes door elements situated adjacent to and along the supporting structures.

11. The automatic flower-selling equipment of claim 10, wherein the door elements are large, arched and made of a transparent material.

12. The automatic flower-selling equipment of claim 1, wherein the selecting partial unit includes a display unit and a data input unit.

13. The automatic flower-selling equipment of claim 1, wherein the distribution ring has individual curves, and wherein the individual curves of the distribution ring and the position of the supporting column in relation to the delivery door are allocated to each other, via the control unit, by means of a distinctive mark.

14. The automatic flower-selling equipment of claim 1, further comprising an opening structure inserted between the housing and the delivery door.

15. The automatic flower-selling equipment of claim 1, wherein the distribution ring has a diameter greater than a diameter of the supporting tray.

* * * * *